US010549923B2

(12) United States Patent
Crissinger et al.

(10) Patent No.: US 10,549,923 B2
(45) Date of Patent: Feb. 4, 2020

(54) ARTICLE ACCUMULATION PATTERN BUILDING LOAD PLATE

(71) Applicant: Douglas Machine Inc., Alexandria, MN (US)

(72) Inventors: Matthew R. Crissinger, Nelson, MN (US); Aaron M. Frederick, Alexandria, MN (US); Thomas H. Peterman, Alexandria, MN (US)

(73) Assignee: Douglas Machine Inc., Alexandria, MN (US)

( * ) Notice: Subject to any disclaimer, the term of this patent is extended or adjusted under 35 U.S.C. 154(b) by 0 days.

(21) Appl. No.: 15/781,236

(22) PCT Filed: Feb. 27, 2017

(86) PCT No.: PCT/US2017/019683
§ 371 (c)(1),
(2) Date: Jun. 4, 2018

(87) PCT Pub. No.: WO2017/147584
PCT Pub. Date: Aug. 31, 2017

(65) Prior Publication Data
US 2018/0354727 A1 Dec. 13, 2018

Related U.S. Application Data

(60) Provisional application No. 62/300,579, filed on Feb. 26, 2016.

(51) Int. Cl.
*B65G 47/08* (2006.01)
*B65B 35/44* (2006.01)
*B65B 5/06* (2006.01)

(52) U.S. Cl.
CPC ............ *B65G 47/084* (2013.01); *B65B 35/44* (2013.01); *B65B 5/061* (2013.01)

(58) Field of Classification Search
CPC ......... B65B 35/44; B65B 5/061; B65B 5/101; B65B 35/50; B65B 35/52; B65G 47/086;
(Continued)

(56) References Cited

U.S. PATENT DOCUMENTS 2,748,917 A 6/1956 Rawe
3,946,879 A * 3/1976 Jensen ................... B65H 33/08
414/791.2

(Continued)

FOREIGN PATENT DOCUMENTS

FR 2248216 5/1975
WO 2017041007 3/2017

OTHER PUBLICATIONS

International Search Report and Written Opinion from PCT/US2017/019683; 16 pages; Lee W. Young; dated Jul. 19, 2017.

*Primary Examiner* — Mark A Deuble
(74) *Attorney, Agent, or Firm* — Dicke, Billig & Czaja, PLLC

(57) ABSTRACT

An article accumulation pattern building load plate assembly is provided. The assembly includes a deck for support of patterned articles, a stop for retaining deck supported articles, and spaced apart guides adjustably positionable in relation to the deck so as to transversely guide articles thereacross towards the stop. Articles of the patterned articles are received at an ingress portion of the assembly from a metered article source, the articles extendable at least across a width of the deck in a direction transverse to an article ingress direction. The stop is adjacent the deck, extending in a direction transverse to the article ingress direction, the stop delimiting an egress portion of the assembly.

51 Claims, 18 Drawing Sheets

(58) Field of Classification Search
CPC ... B65G 47/084; B65G 47/082; B65G 47/088
See application file for complete search history.

(56) References Cited

U.S. PATENT DOCUMENTS

| | | | | |
|---|---|---|---|---|
| 3,998,141 | A * | 12/1976 | Hsiue | B65H 29/6618 414/789.1 |
| 4,600,065 | A * | 7/1986 | Morris | G01G 13/241 141/128 |
| 4,608,808 | A | 9/1986 | Ryan et al. | |
| 5,209,339 | A | 5/1993 | Antonissen | |
| 5,906,468 | A * | 5/1999 | Vander Syde | B07C 1/025 414/403 |
| 6,189,677 | B1 | 2/2001 | Ruf | |
| 6,382,391 | B1 | 5/2002 | Singleton | |
| 6,622,848 | B1 | 9/2003 | Lattimer | |
| 7,856,797 | B2 | 12/2010 | Black | |
| 8,647,040 | B2 * | 2/2014 | Nice | B65H 1/30 414/405 |
| 8,939,274 | B1 * | 1/2015 | Ross, Jr. | B65H 1/025 198/418.9 |
| 9,126,759 | B2 | 9/2015 | Bauer | |
| 9,802,720 | B2 * | 10/2017 | Baylor | B65B 5/06 |
| 2006/0070353 | A1 | 4/2006 | Van Dam | |
| 2012/0006651 | A1 | 1/2012 | Cote | |
| 2013/0008462 | A1 | 1/2013 | Beck | |
| 2013/0177378 | A1 | 7/2013 | Tuominen et al. | |
| 2015/0367515 | A1 | 12/2015 | Pace et al. | |

* cited by examiner

ARTICLE ACCUMULATION PATTERN BUILDING LOAD PLATE

CROSS-REFERENCE TO RELATED APPLICATIONS

This utility patent application is a U.S. National Stage filing under 35 U.S.C. § 371 of application Ser. No. PCT/US2017/019683, filed Feb. 27, 2017, which is an international patent application filed under 35 USC § 363 claiming priority under 35 USC § 120 of/to U.S. Pat. Appl. Ser. No. 62/300,579 filed Feb. 26, 2016, incorporated by reference in its entirety.

TECHNICAL FIELD

The present invention is generally directed to one or more of apparatuses, devices, assemblies, subassemblies, and/or methods for/of article manipulation in furtherance of article group formation. More particularly, the instant disclosure is directed to one or more of apparatuses, devices, assemblies, or subassemblies to effectuate conveyed article accumulation and article pattern building for the accumulating articles in advance of accumulated article transfer and/or loading operations.

BACKGROUND

Various mechanisms are known to effectuate the grouping/packaging of articles from a source of flowing articles in advance of loading operations. Since the advent of robotic article loading operations, the functionality of robotic apparatus has expanded from loading (i.e., transfer/loading) to "front end" article accumulation operations which are then followed by transfer and loading operations. While such multi-tasking is common of robotic systems, it is not exclusive to such apparatus. Alternate mechanized assemblies for pushing, stacking, pulling and/or rotating articles in furtherance of accumulation and/or article pattern building are known and commercially available.

Illustrative of article handling operations characterized by the accumulation, aggregation and/or grouping of articles such as bags, pouches, cartons, etc. and their subsequent loading (e.g., top case loading), are the teachings of Black et al. (U.S. Pat. No. 7,856,797) and Cote (U.S. Pub. No. 2012/0006651), as well as Applicant's work memorialized in their Patent Cooperation Treaty (PCT) appl. ser. no. PCT/US2016/050222, filed Sep. 2, 2016 and entitled "Improved Robotic Article Handling System & Operation," incorporated herein by reference in its entirety. Further noteworthy work of Applicant includes apparatus and methods for preliminary article placement to enhance/facilitate article accumulation, aggregation and/or grouping, namely, work directed to an article divider conveyor (i.e., colloquially, a product placement conveyor (PPC)) as per U.S. Pat. No. 9,586,706 entitled "Apparatus and Methods for Loading Product Into Cases," the entirety of which is likewise incorporated herein by reference.

While improvements continue and technology advances, solutions have become and/or are continuing to be expensive. It remains advantageous to swiftly, carefully and reliably accumulate articles from an inflow of articles, and further still to accumulate articles in select patterns or configurations for transfer and placement elsewhere in furtherance of loading same. Moreover, it is believed advantageous and desirable to provide a minimally complex apparatus, assembly, system and/or process which accurately and repeatedly forms an accumulated article pattern of high density and/or minimal footprint, more particularly, a high density accumulated article pattern that is readily transferred/transferably with minimal pattern disruption so as to effectuate reliable loading operations.

SUMMARY OF THE INVENTION

An article accumulation pattern building load plate assembly is provided. The assembly includes a deck for support of patterned articles, a stop for retaining deck supported articles, and spaced apart guides adjustably positionable in relation to the deck so as to transversely guide articles thereacross towards the stop. Articles of the patterned articles are received at an ingress portion of the assembly from a metered article source, the articles extendable at least across a width of the deck in a direction transverse to an article ingress direction. The stop is adjacent the deck, extending in a direction transverse to the article ingress direction, the stop delimiting an egress portion of the assembly.

Advantageously, the instant assembly is of modular design, the assembly adapted for select operative deployment, in the context of a robotic article handling system, during flat pack operations, for instance as be pivoting from a stowed to select angular oriented operative condition. Moreover, the assembly contemplates arrayed article patterning, for instance and without limitation, 2×1, 3×1, 4×1, 2×2 and 3×3 arrayed article group patterning.

Advantageously and desirably, the stop is notionally provided as a fast acting gate, actuatable between first and second operative positions, the first operative position for patterned article retention, the second operative position for patterned article release. Moreover, the deck may be equipped with an actuatable lifter, and/or the assembly further adapted to include spaced apart blocks operably positionable over select portions of the deck. Articles are receivable upon the operably positioned lifter and/or spaced apart blocks so as to be in an elevated condition relative to a surface of the deck, thereby enable especially advantageous arrayed article pattern formation. More specific features and advantages obtained in view of the summarized features will become apparent with reference to the drawing figures and DETAILED DESCRIPTION OF THE INVENTION.

BRIEF DESCRIPTION OF THE DRAWINGS

FIGS. 1-18 are provided herewith wherein:

FIG. 1 depicts, first side perspective view, an advantageous, non-limiting robotic article handling system, such system readily adapted for inclusion of the one or more contemplated article accumulation pattern building load plates disclosed herein/hereinafter;

FIG. 2 schematically depicts elements of a robotic article handling system not inconsistent with that of FIG. 1, a first article accumulation pattern building load plate shown, 2×1 article patterning shown/groups formed;

FIG. 3 depicts the FIG. 2 elements at a later time, an earlier formed article group rotatingly transferred to effectuate alternately oriented layered flat packing while a first article is received by the article accumulation pattern building load plate;

FIG. 4 schematically depicts elements of a robotic article handling system not inconsistent with that of FIG. 1, a further second article accumulation pattern building load plate shown, 3×1 article patterning shown/groups formed;

FIG. 5 depicts the FIG. 4 elements at a later time, an earlier formed article group rotatingly transferred to effectuate alternately oriented layered flat packing while a first article is received by the article accumulation pattern building load plate;

FIG. 6 depicts a further third article accumulation pattern building load plate, 2×2 shingled article patterning shown/ groups formed;

FIGS. 7-14 each schematically depicts elements of a robotic article handling system not inconsistent with that of FIG. 1 in operative combination with the article accumulation pattern building load plate of FIG. 6, a 2×2 shingled article patterning progression sequence shown, formed article groups rotatingly transferred to effectuate alternately oriented layered flat packing;

FIG. 15 depicts, first side perspective view slightly from above, process flow page left to page right, an advantageous apparatus or assembly combination for the system of FIG. 1 (area "A" thereof), a further fourth article accumulation pattern building load plate shown downstream of a product placement conveyor and in an active processing configuration;

FIG. 16 depicts, side elevation view, the article accumulation pattern building load plate of FIG. 15;

FIG. 17 depicts, end elevation view (orthogonal), the article accumulation pattern building load plate of FIG. 15; and, FIG. 18 depicts, underside perspective slightly from the side, process flow page bottom to page top, the article accumulation pattern building load plate of FIG. 15.

DETAILED DESCRIPTION OF THE INVENTION

Preferred, non-limiting assemblies, structures and/or mechanisms relating to and for improved/simplified article accumulation pattern building are generally disclosed and presented throughout the figures of the subject disclosure. In advance of particulars for or with regard to the instant article accumulation pattern building load plate assembly, in all contemplated and/or disclosed forms, some preliminary observations and/or comments as to Applicant's approach to article group formation are set forth. Moreover, an overview of the structure of the subject disclosure is likewise set forth thereafter.

First, Applicant provides an elegant alternative to highly mechanized robotic article accumulation and/or pattern building systems. Notionally, articles from a metered article source are sequentially received at an ingress portion of an apparatus for article accumulation and pattern building, a deck of the apparatus supporting patterned (e.g., arrayed) articles, with a stop retaining the articles sequentially received, accumulated and patterned, the stop delimiting an egress portion of the apparatus. Having established or delimited a patterned article group, the group may be picked-and-placed, or otherwise transferred, in furtherance of sought after packing/processing objectives, for example and without limitation, layered flat pack cartoning.

Figure 1:
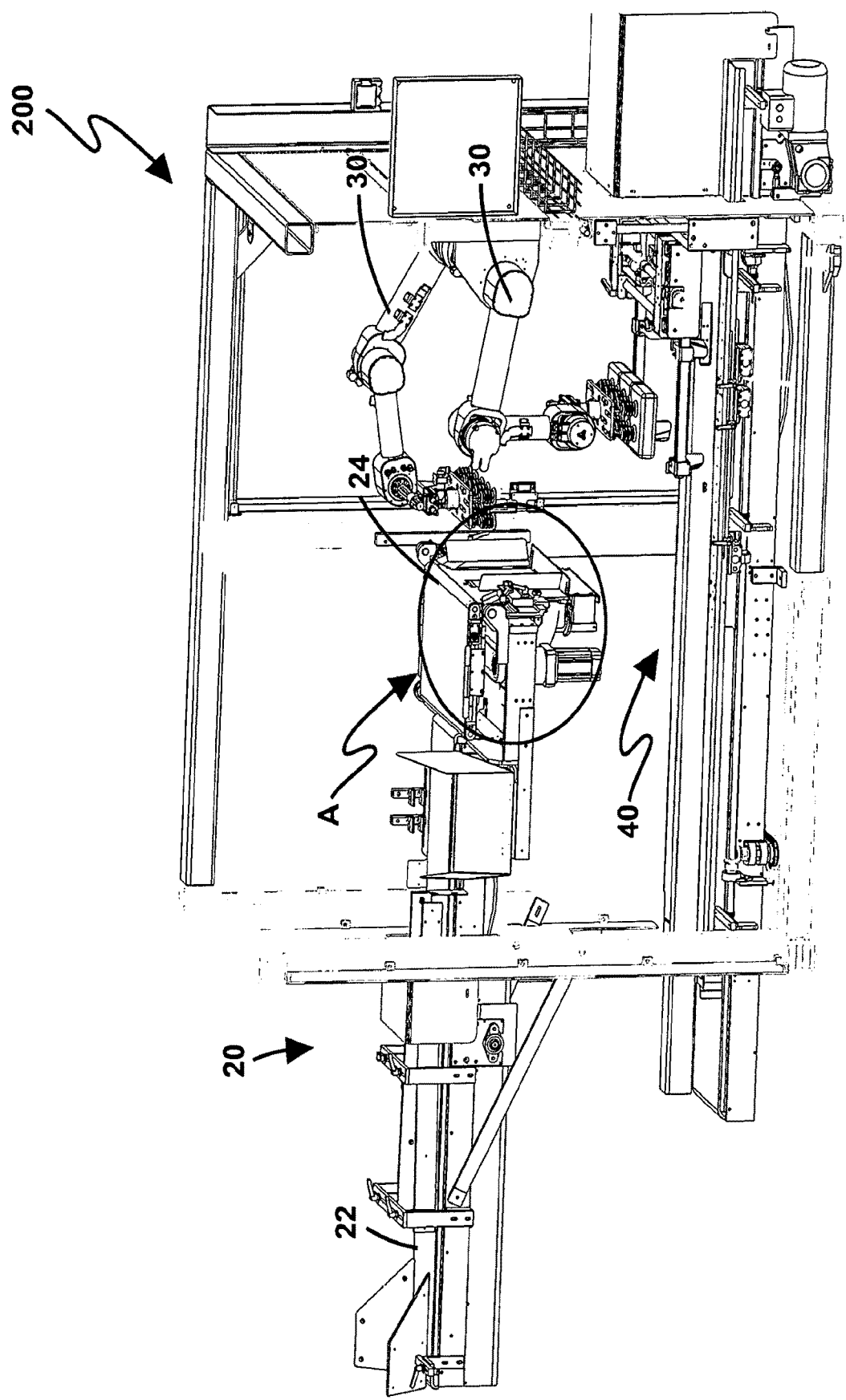
Figure 2:
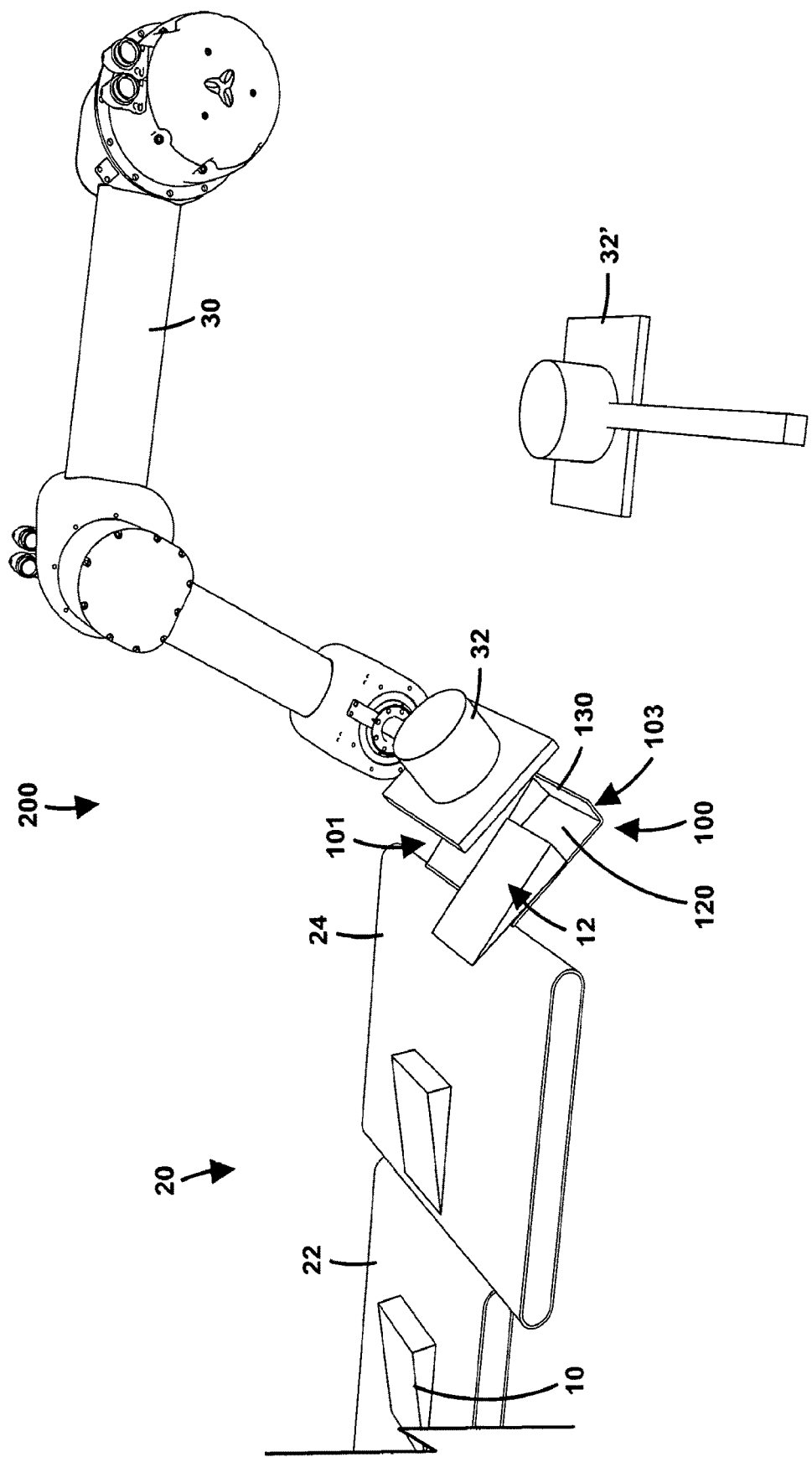
Figure 3:
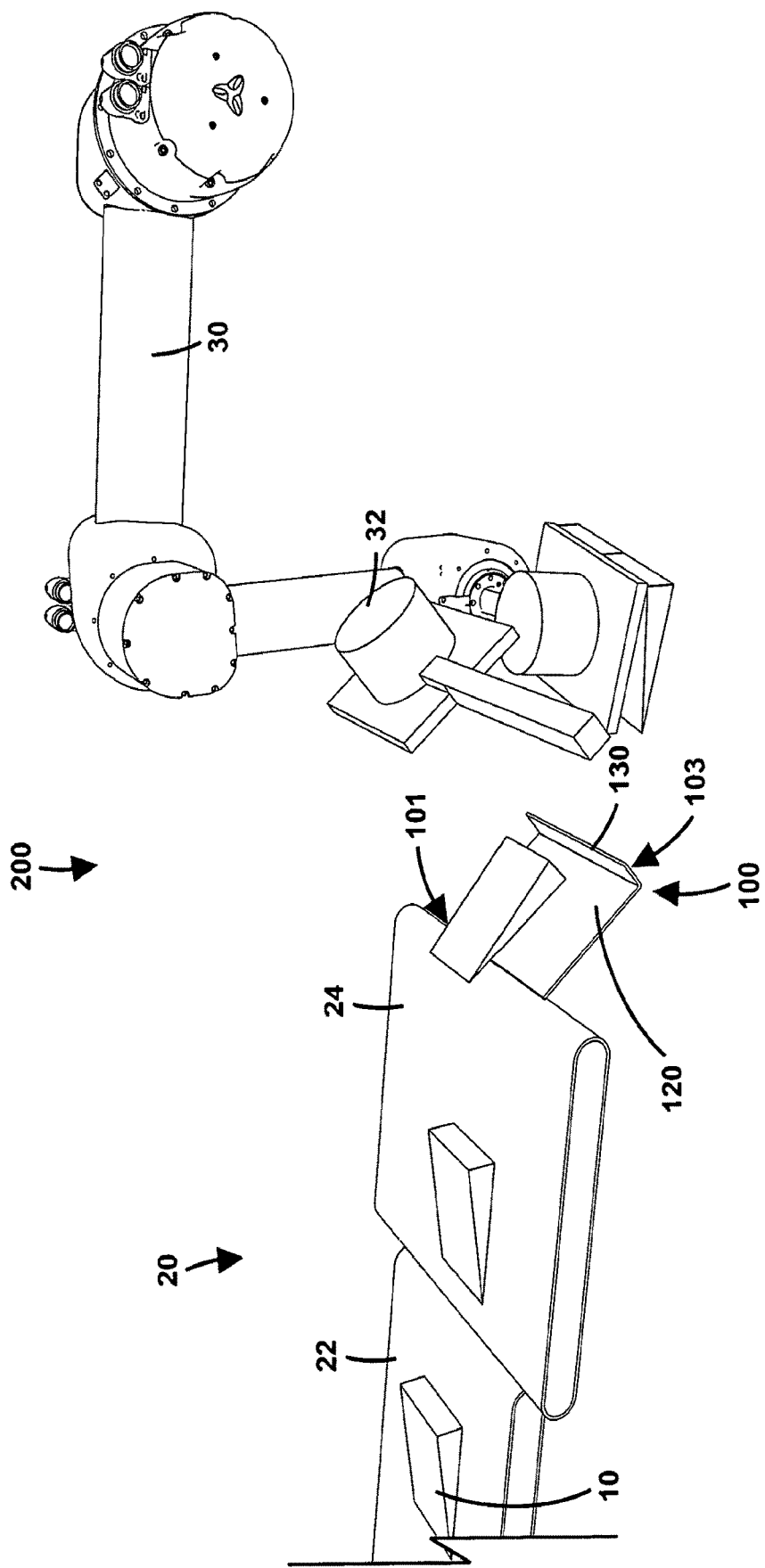
Figure 4:
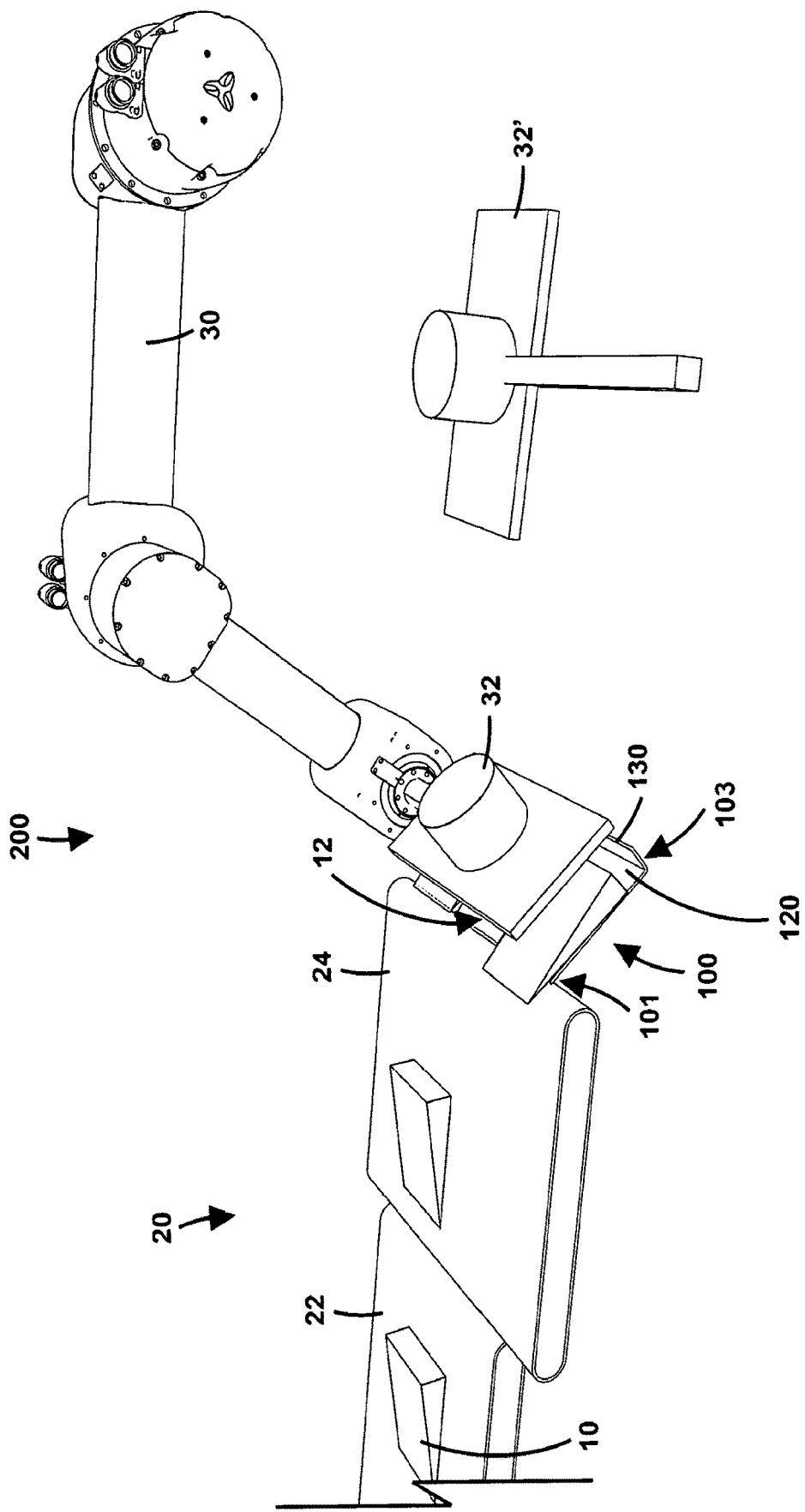
Figure 5:
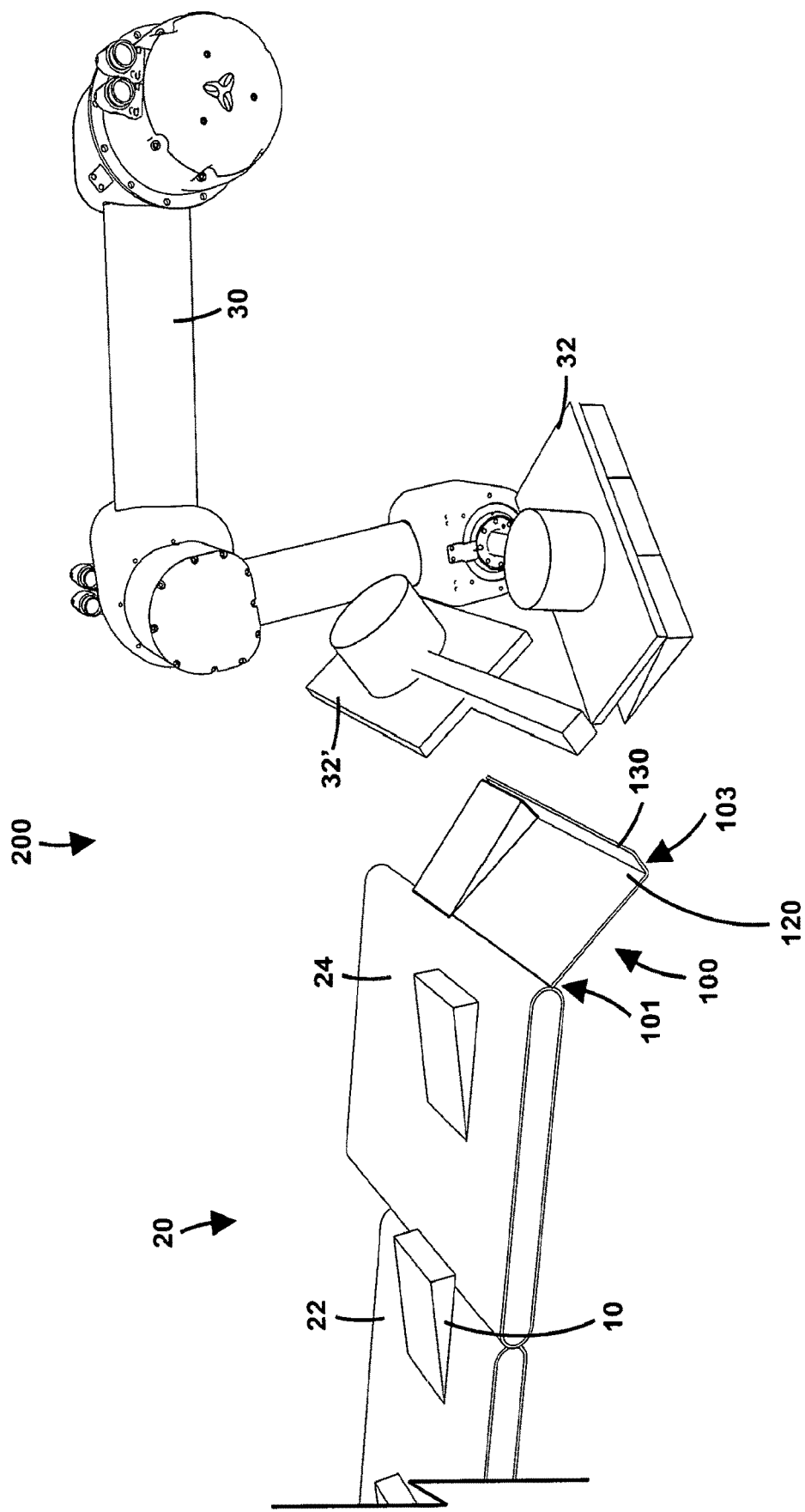

Second, the instant disclosure notionally proceeds from the general to the particular, with a variety of article accumulation pattern building load plates contemplated. As will be subsequently taken up, structures for 2×1, 3×1, and 2×2 article array patterning are shown in FIGS. 2 & 3, FIGS. 4 & 5, and FIGS. 6-14 respectively, with an especially advantageous article accumulation pattern building load plate shown in FIG. 15, and the related depictions of FIGS. 16-18. A representative, non-limiting system/setting for the contemplated article accumulation pattern building load plates is shown in FIG. 1. Finally, to the extent articles (e.g., products) are depicted, contemplated processing (i.e., accumulation and accumulated pattern building) is not limited to the illustrative, non-limiting articles shown, products in the form of pouches, bags, cartons, etc. are contemplated and readily operated upon.

With initial and general reference to FIGS. 1-14, there is schematically shown, in connection to a robotic handling system 200, an article infeed system 20, an article accumulation pattern building load plate 100 downstream thereof, a pair of robotic arms 30, 30' equipped with end effectors 32, 32', and a case presenter 40 (FIGS. 7-14). Patterned article groups 12 are secured by end effectors 32, 32' of robotic arms 30, 30' for loading into cases 42 of case presenter 40.

Articles 10 are advantageously conveyed from a metered article supply via a conveyor 22 of article infeed system 20. Advantageously, a divider conveyor 24 of article infeed system 20 receives articles from conveyor 22 and passes them to load plate 100. Notionally, articles may suitably manipulated by divider conveyor 24, e.g., a product placement conveyor (PPC) as previously cited, or other suitable mechanism that results in column formation (i.e., in fed articles are acted upon in furtherance of discharging transversely displaced articles). Articles of the infeed conveyor may be gapped or gapped and divided as circumstances warrant, a side-by-side arrayed (i.e., columnar) article distribution thereby established.

Figure 15:
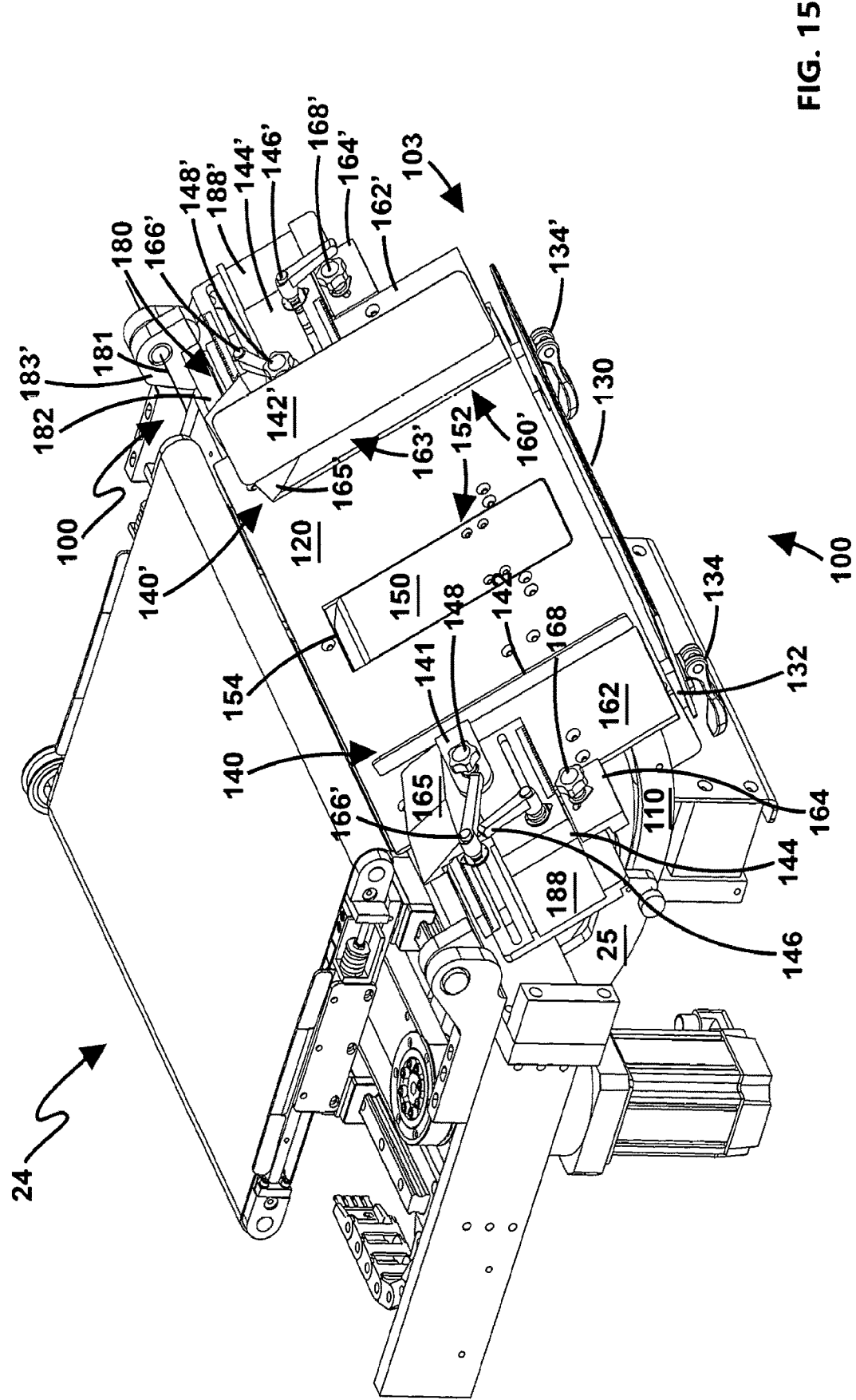

As is appreciated with continued reference to FIGS. 1-14, and with an initial passing reference to FIG. 15, accumulation pattern building load plate 100 is generally characterized by ingress 101 and egress 103 portions, a deck 120 for support of patterned (e.g., arrayed) articles, and a stop 130, adjacent deck 120 and delimiting egress portion 103 of load plate 100, for retaining articles sequentially received at ingress portion 101 of article accumulation pattern building load plate 100. Moreover, accumulation pattern building load plate 100 may be further, and advantageously but not necessarily, characterized by spaced apart guides 142, 142', of guide subassemblies 140, 140', adjustably positionable in relation to deck 120 so as to direct articles towards stop 130 (see e.g., FIGS. 6 & 15). Notionally, the guides, which generally extend in the direction of process/article flow, may be drawn together/apart relative to each other, or one relative to the other across a face or width of the deck (i.e., a direction transverse to process/article flow). Moreover, the guides are adapted for select rotation as circumstances warrant, or as may be desirable, in furtherance of establishing a tapered article chute (i.e., narrowing in the direction of process/article flow to aid in compact article array formation).

The deck generally supports a patterned article group, articles of the patterned article group sequentially received at the ingress portion of the article accumulation pattern building load plate. Articles of the patterned article group extend at least across a width of the deck in a direction transverse to metered article process flow.

The stop retains articles sequentially received at the ingress portion of the article accumulation pattern building load plate, and thus the patterned article group. The stop is adjacent the deck, extending in a direction transverse to metered article process flow and delimiting the egress portion of the article accumulation pattern building load plate.

In connection to article pattern formation, article arrays are advantageously contemplated. For the sake of convention and understanding, the terms "rows," "columns," and "array(s)," as appearing and used in the instant disclosure, are generally given their customary and ordinary meaning, namely, "rows" align with or extend in a direction of process/article flow (e.g., in an article ingress direction), "columns" align with or extend in a direction transverse of process/article flow, with "arrays" being a generally rectangular arrangement of articles in rows and columns. As expressed herein, and for example, a 2×1 array is characterized by a single row and two columns (see e.g., FIG. 2).

In advance of a brief overview of contemplated article and patterned article group processing, an especially advantageous and desirable functionality warrants introduction. With "tight" article patterning believed advantageous and desirable, article manipulations are undertaken part-and-parcel of pattern building. For instance, in-as-much as articles may be manipulated in an overhead plan context (i.e., channeled or funneled in an article processing direction) to produce a greater adjacency of articles of/for a given column, articles may be manipulated in a vertical or elevational plan context so as to create a degree of overlap for rows (FIG. 6) or for columns (FIG. 15) as will be subsequently presented.

Figure 6:
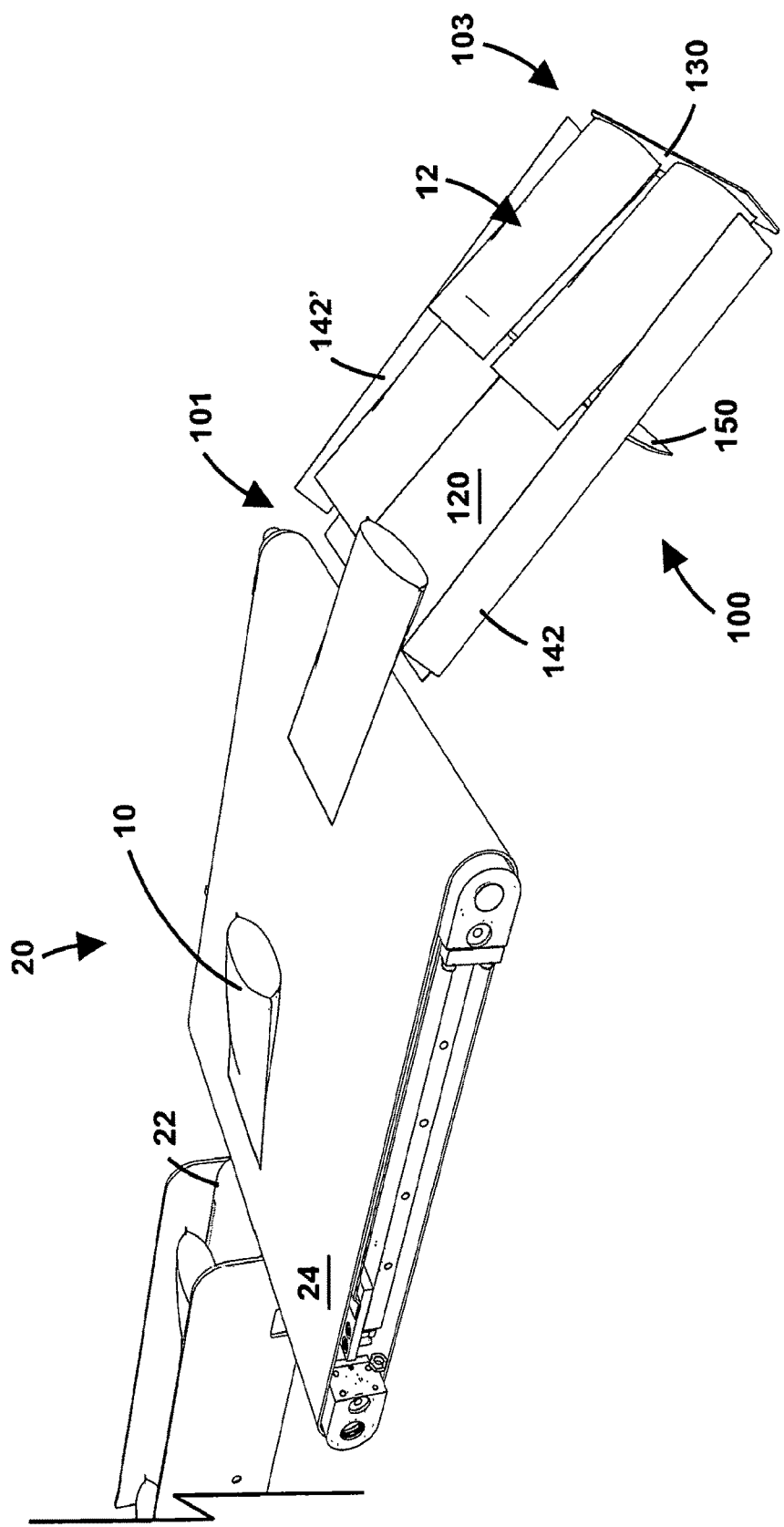

With particular reference to the sequence of FIGS. 7-14, an overview of representative, non-limiting article and patterned article group processing follows in connection to the article accumulation pattern building load plate of FIG. 6. Preliminarily, the after described processing generally applies, with little departure, to the processing approach depicted in either of FIGS. 2 & 3 or FIGS. 4 & 5.

Figure 7:
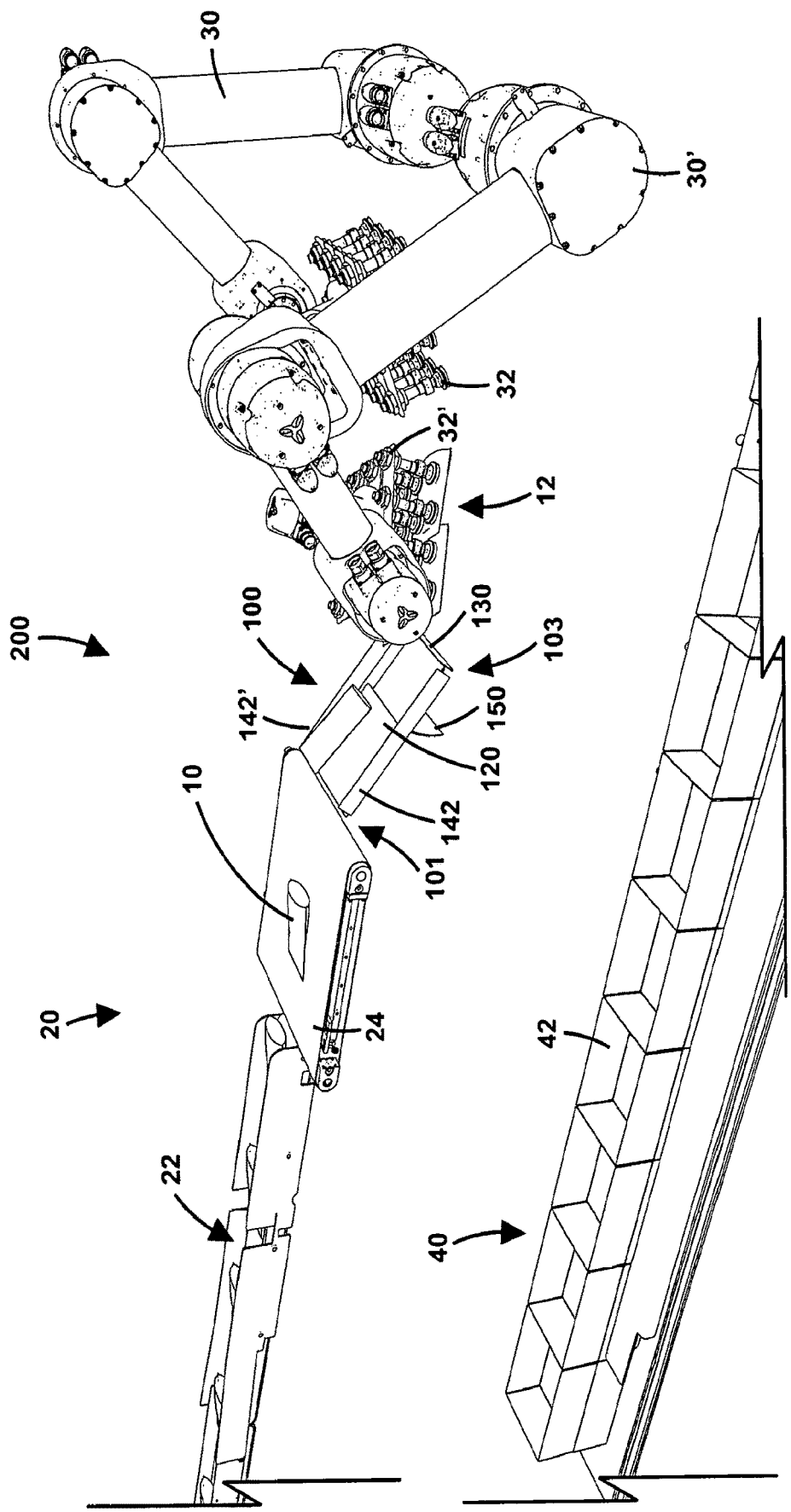
Figure 8:
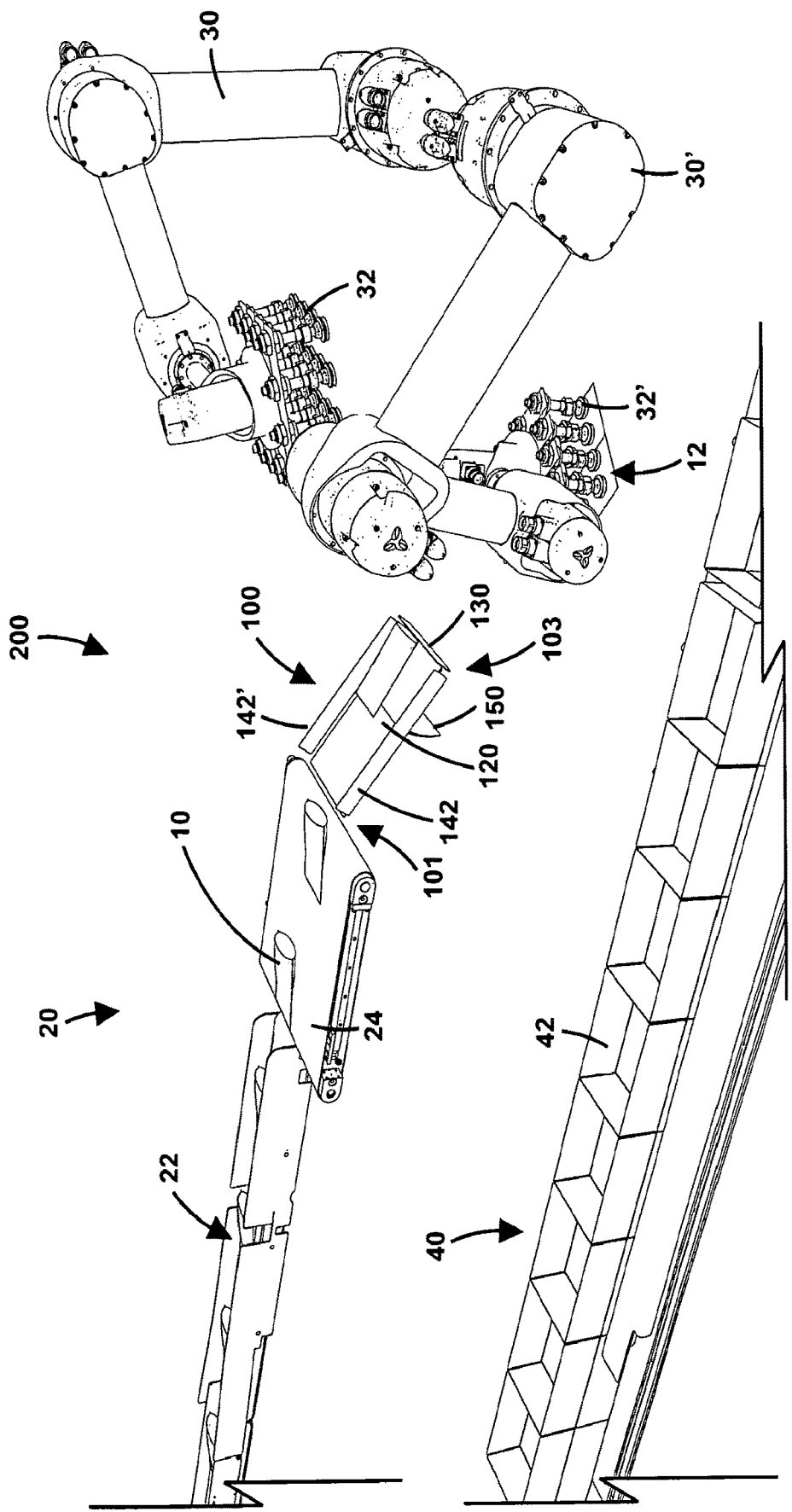

As per FIGS. 6 & 7, articles, e.g., gusseted bottomed stand-up pouches, flow page left to right, gusset leading, via article infeed system 20, more particularly and not necessarily, into divider conveyor 24 from article conveyor 22. As is generally indicated (FIG. 6), divider conveyor oscillates in a direction transverse to process/article flow, thusly delivering columnated articles to article accumulation pattern building load plate 100. The load plate is adjacent a distal, downstream most end portion of the divider conveyor (i.e., an egress end portion) and angularly disposed in relation thereto (i.e., downwardly sloping in the direction of process/article flow).

As is readily appreciated, discharged articles are received, in a sense caught, by the load plate, and retained via the stop. The departure angle from horizontal for the load plate (i.e., deck thereof) is generally in the range of about 20-65 degrees, with article mass, shape/configuration, contents, and ingress velocity consideration factors.

While select deck positioning, fixed or adjustable, is conventionally achievable, it is believed advantageous to pivotingly unite the load plate, via a hinged frame or structural element, to a corresponding support element of an assembly characterized by the load plate (see e.g., the operative combination of FIG. 15) in furtherance of establishing a select angular adjustment to meet a given processing objective. Moreover, such configuration permits ready stowage of the load plate assembly in a functionally more robust article handling system during alternate, non-pattern building operations as will be later described in connection to FIGS. 15-18.

Figure 9:
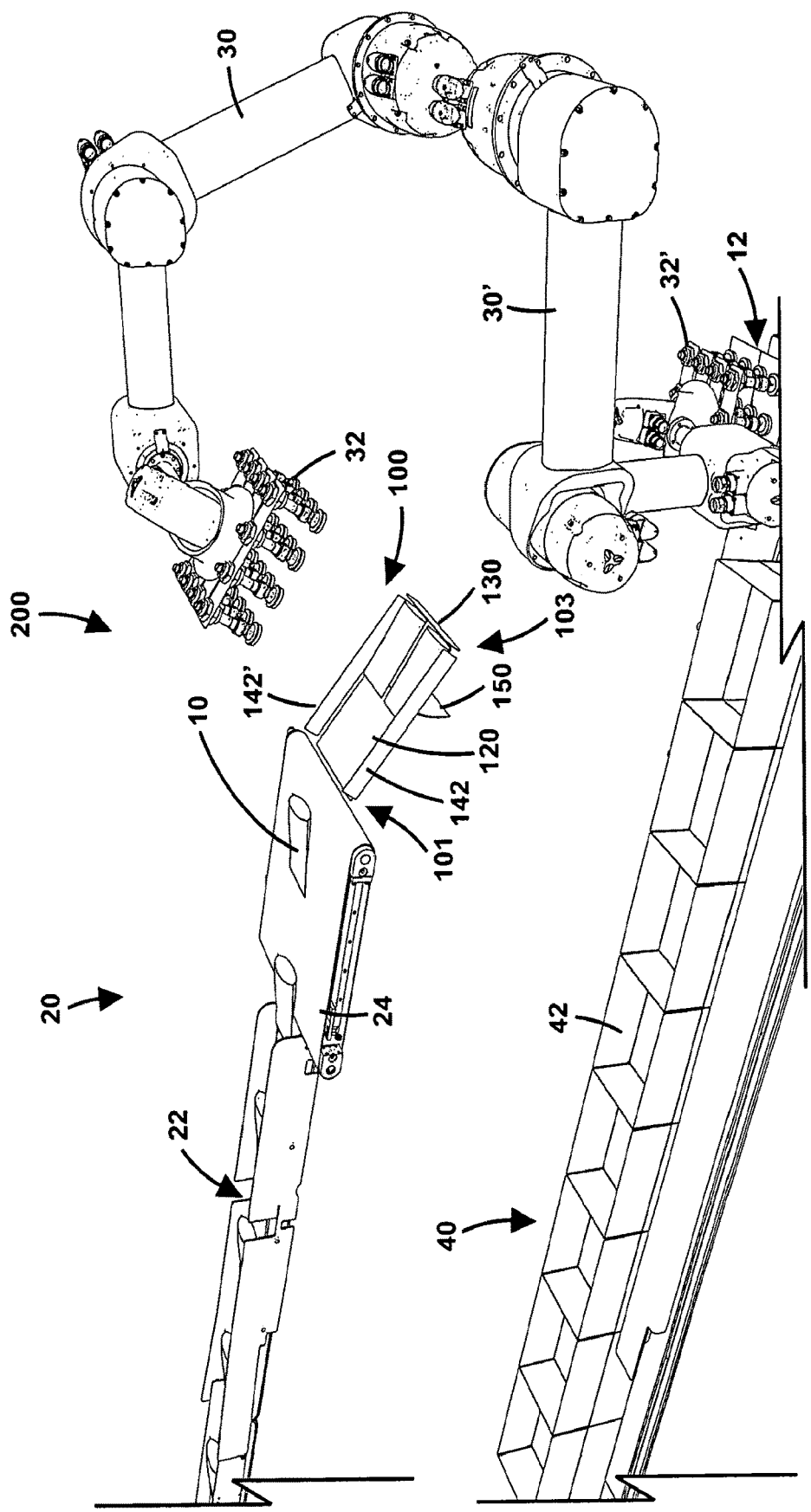
Figure 10:
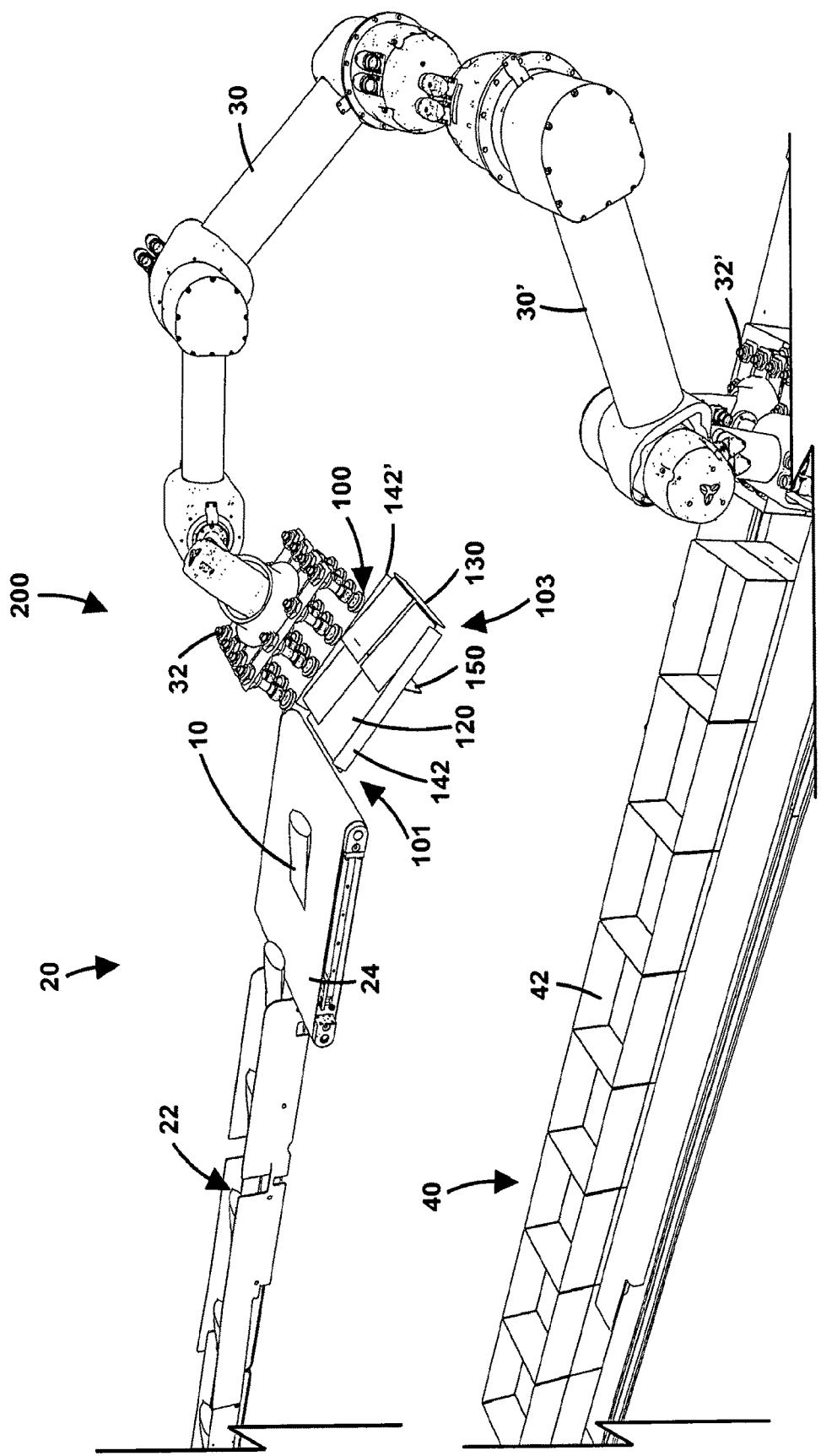
Figure 11:
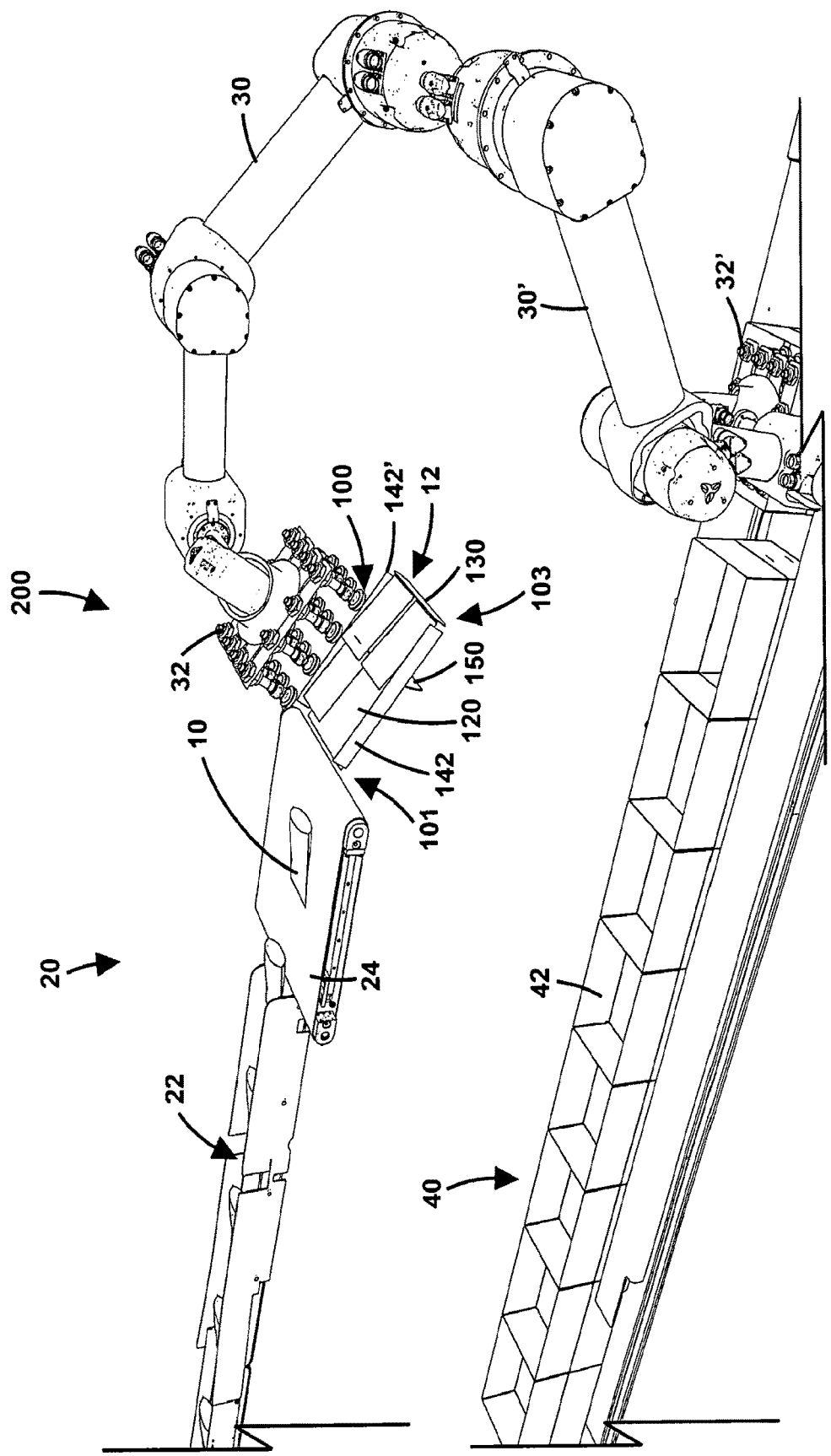
Figure 12:
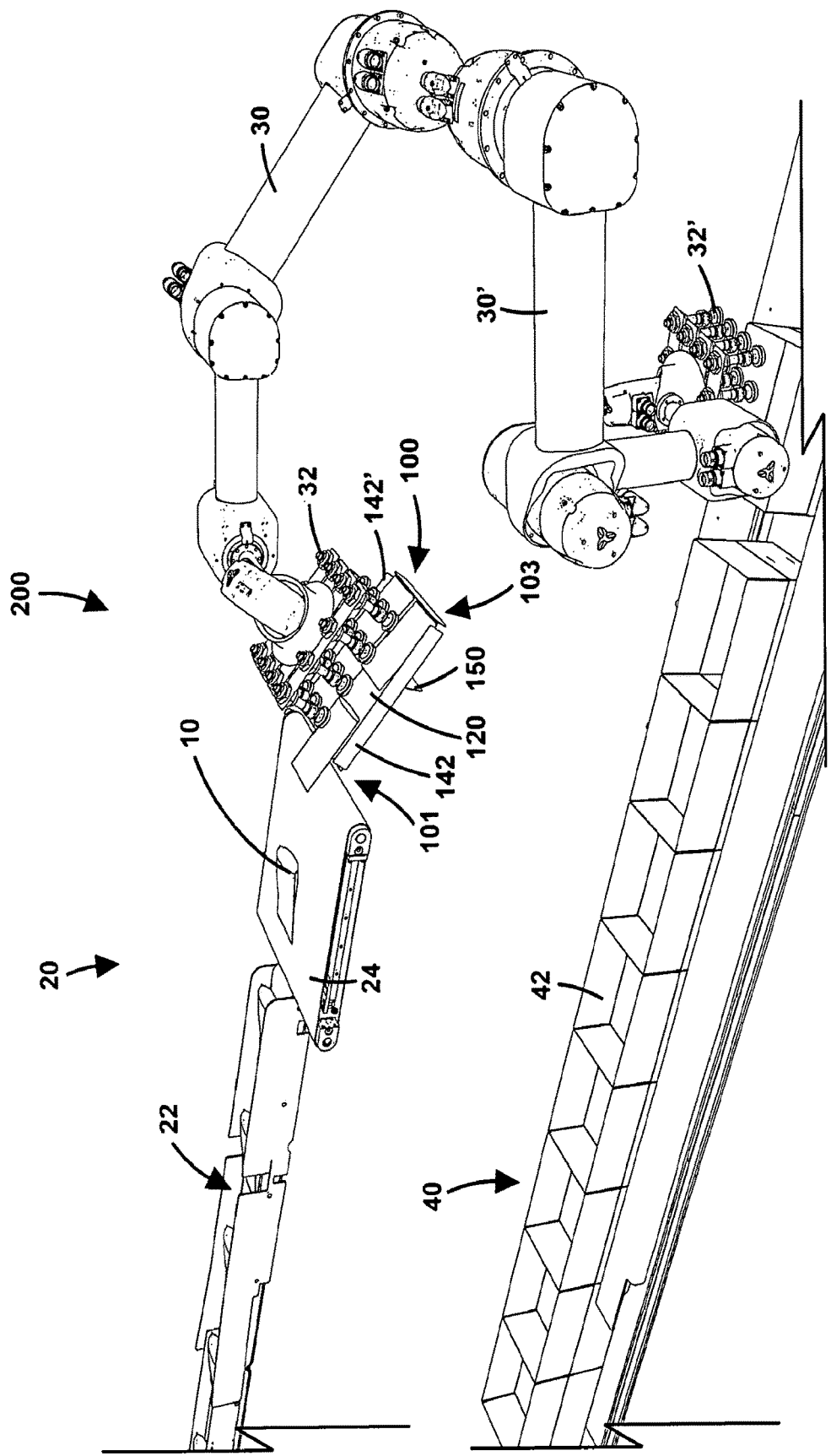

As to the process, a first article essentially spills off/over divider conveyor 24 as an earlier established 2×2 article array is secured and transferred from load plate 100 by a first robotic arm 30, divider conveyor 24 having oscillated to deliver a second article adjacent the first (FIG. 7), the second article spilling off/over divider conveyor 24 as the first article rests against the stop (FIG. 8), the second article retained upon load plate 100 adjacent the first article via stop 130 of load plate 100 (FIG. 9). During this sequence, the 2×2 article array, secured by end effector 32 of robotic arm 30, is rotated 180 degrees (i.e., from a gusset-end-downstream to a gusset-end-upstream orientation) such that this article group lift or layer is opposingly disposed in relation to the prior cartoned 2×2 article array or group to thereby effectuate an advantageous close packing.

Figure 13:
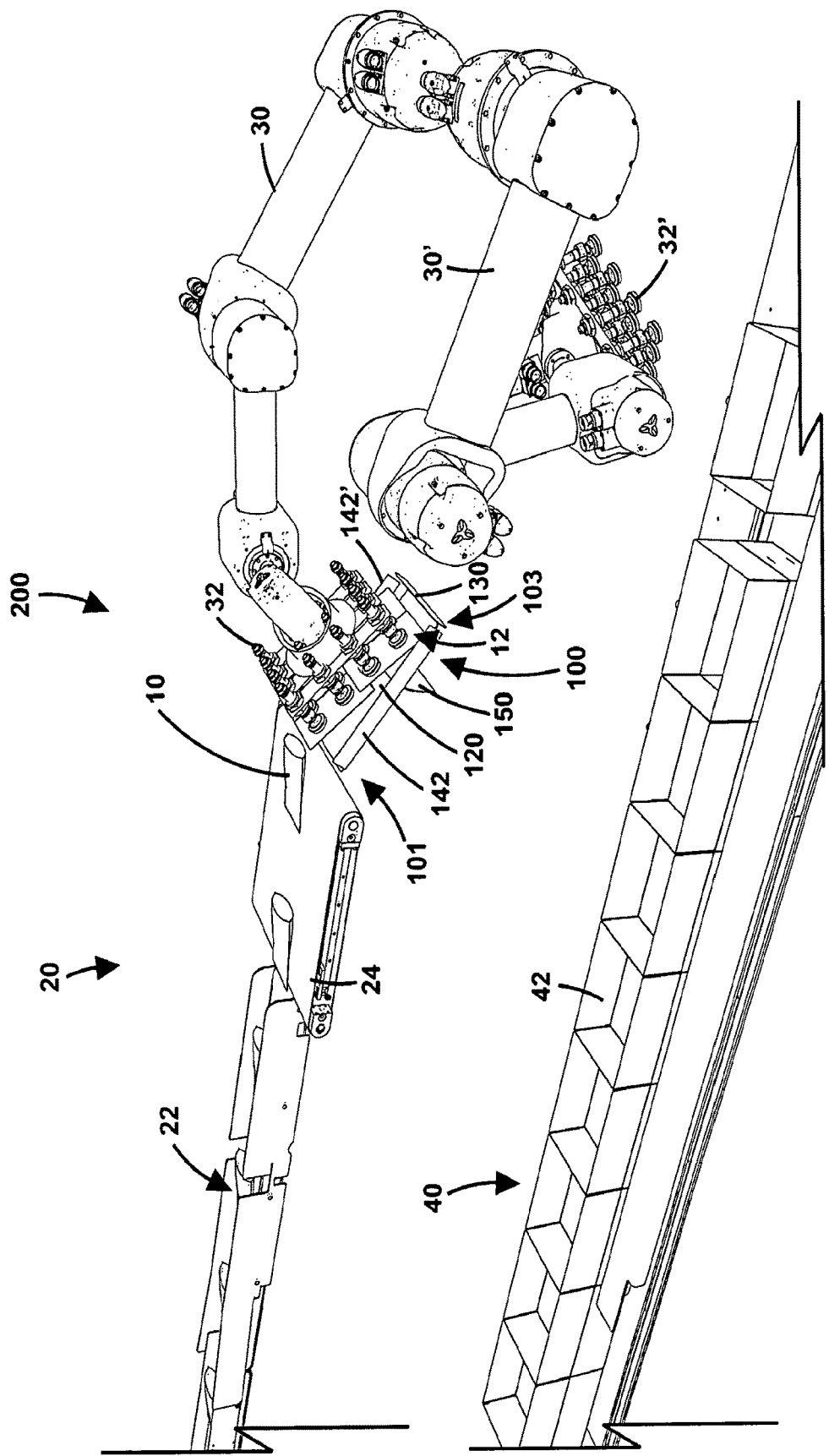
Figure 14:
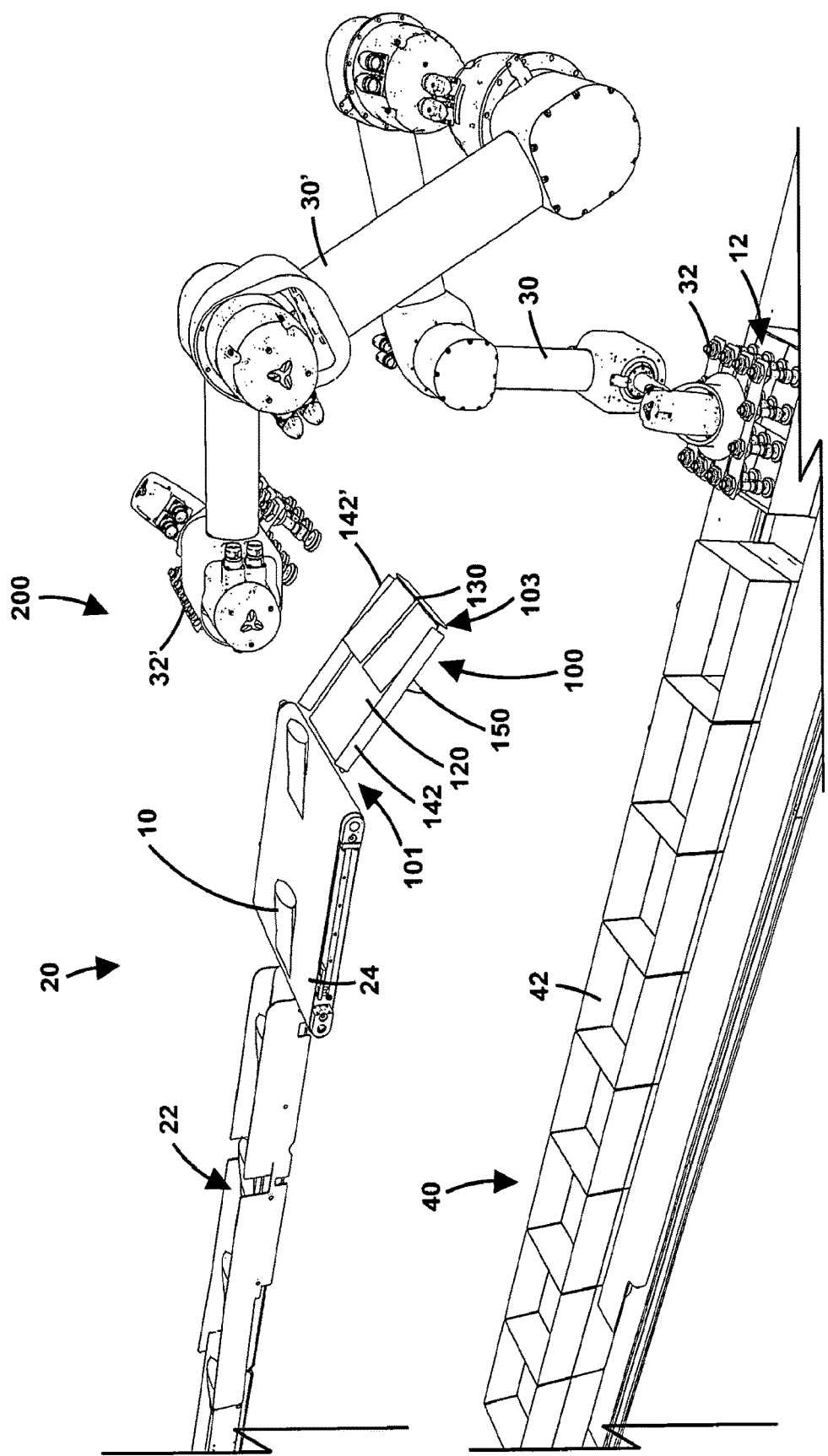

In advance of forming a second article row (i.e., at a time after the FIG. 9 depiction), an actuatable lifter 150 (see also FIG. 6) is actuated to create a vertical space between deck 130 and the upstream article ends (i.e., "tops") such that articles of the incoming row (i.e., the gusseted bottoms thereof) may be partially received thereunder to effectuate a shingled array formation in furtherance of forming a close or tight pattern pack. Thereafter, second row article processing proceeds in keeping with first row processing/formation (FIGS. 10-12), a second robotic arm 30' approaching load plate 100 after having cartoned an earlier formed article array, first robotic arm 30 cartoning the immediately earlier formed article array. Finally, the just formed article array (FIG. 12) is secured by end effector 32' of the second robotic arm 30' and subsequently transferred, without rotation, for layered cartoning a top the previously cartoned article array (FIG. 13).

With general reference now to FIGS. 15-18, an especially advantageous article accumulation pattern load plate assembly is depicted and hereinafter described. The load plate is initially depicted (FIG. 15) in operative combination with a preferred, non-limiting divider conveyor apparatus. Thereafter, the load plate assembly is shown in side elevation (FIG. 16), front elevation (FIG. 17), and underside plan (FIG. 18) views.

In advance of assembly particulars, it is to be noted that the depicted combination and assembly is desirably, advantageously but not necessarily offered part-and-parcel of a robotic article handling system, for instance, as an optional, operably optional subassembly of robotic article handling system 200 of FIG. 1 (note area "A" thereof; see also Applicant's earlier cited teaching (i.e., PCT appl. ser. no. PCT/US2016/050222)). Applicant Douglas Machine Inc., MN, USA, contemplates optional inclusion of the FIG. 15-18 load plate assembly relative to their TRIVEX® top load case/tray packers.

Figure 16:
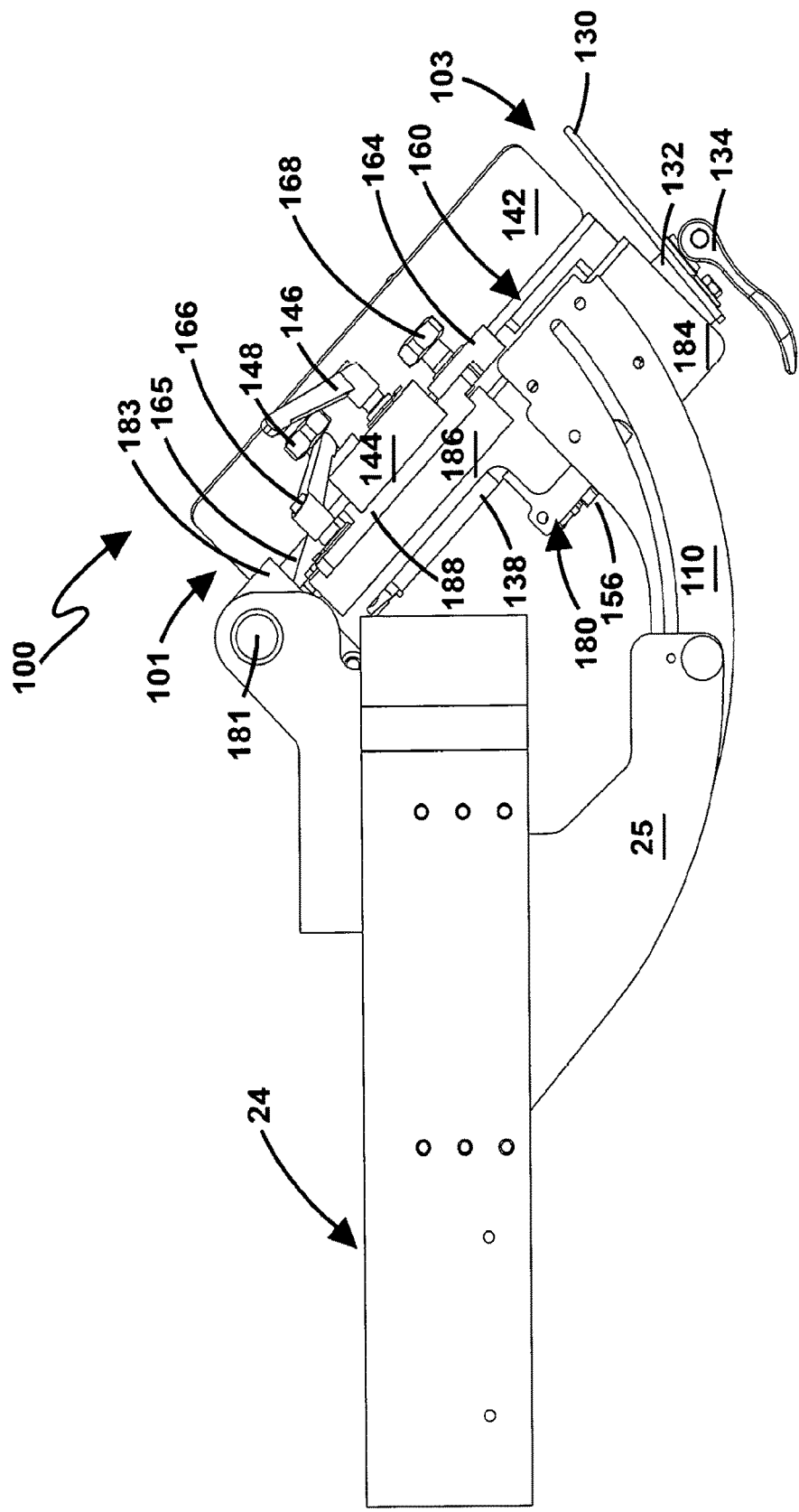

As is readily appreciated with initial reference to and comparison of FIGS. 1 & 15, and reference thereafter to FIG. 16, the contemplated load plate assembly 100 is situated distal of divider conveyor 24, more generally article infeed system 20, for a pivotingly extended deployment from a stand by or stowed condition (i.e., substantially vertical position) to an indexably operative condition. As is best appreciated with reference to FIG. 16, the assembly is advantageously equipped with a positioner, e.g., an arcuate plate 110 as shown, adapted for cooperative receipt and selective engagement with a positioner guide 25 supported by a structural element 26 of article infeed system 20, more particularly, divider conveyor 24 as shown (FIG. 15). Via such adaptation, flat pack operations in addition to top load operations are readily achievable, again, in the context of the supremely efficient, high speed, small footprint dual robotic Trivex robotic article handling system.

Article accumulation pattern building load plate 100 is generally and fairly characterized by ingress 101 and egress 103 portions. Again, articles essentially spill over/off the divider conveyor 24, more particularly, articles sequentially spill over at select transverse locals in furtherance of the establishment of columns (e.g., a "two across the machine" pattern).

As shown, article accumulation pattern building load plate 100 generally includes a deck 120 for support of patterned articles, a stop 130 for retaining deck supported articles, and spaced apart guides 142, 142' of subassemblies 140, 140' adjustably positionable in relation to the deck so as to transversely guide articles traveling from the ingress portion of the load plate towards the stop. A frame, e.g., a pivotably mounted/mountable frame 180 as shown, supports deck 120 and generally functions as a structural element for the assembly which advantageously but not necessarily, further includes operatively positionable spaced apart blocks 162, 162' of block subassemblies 160, 160' upon which articles may be received, and actuatable lifter 150, vertically extendable from a surface of deck 120 via actuator 156, for selective article receipt.

Figure 18:
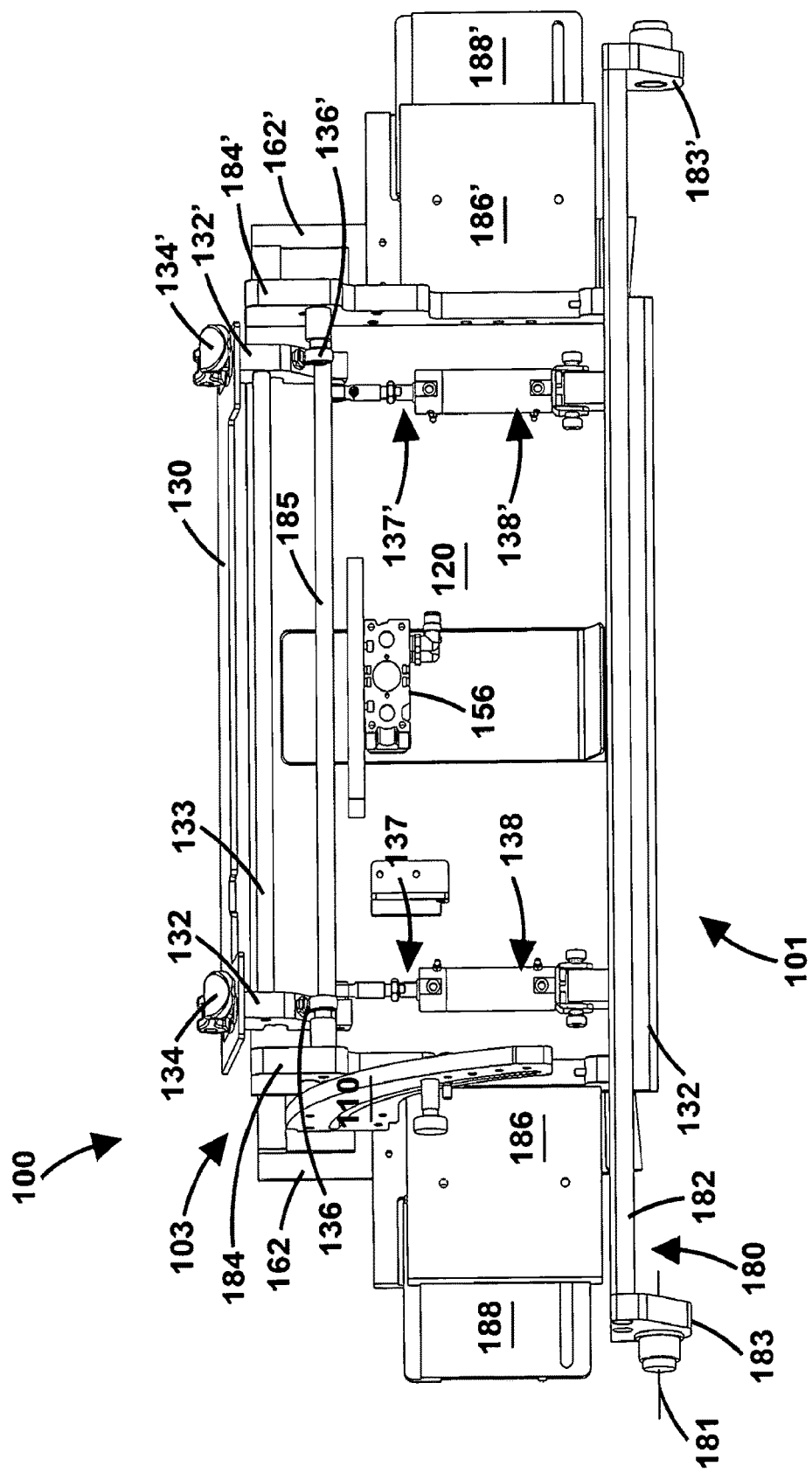

Deck 120 is generally supported at its underside (FIG. 18). A longitudinal frame member 182 traverses an end portion or edge of deck 120 across its width, with opposingly paired lateral frame members 184, 184' extending therefrom and traversing side portions or edges of deck 120 across its length. Lateral frame members 184, 184' are united by a brace 185 or the like generally opposite longitudinal frame member 182. Opposing ends of longitudinal fame member 182 are equipped with flanges 183 adapted for operative rotation, a pivot axis 181 thereby defined for frame 180 and thus assembly 100. Opposing subassembly supports 186, 186' depend from frame 180, more particularly, subassembly supports 186, 186' laterally extend outward from lateral frame members 184, 184' and rearwardly extend from longitudinal frame member 182.

Figure 17:
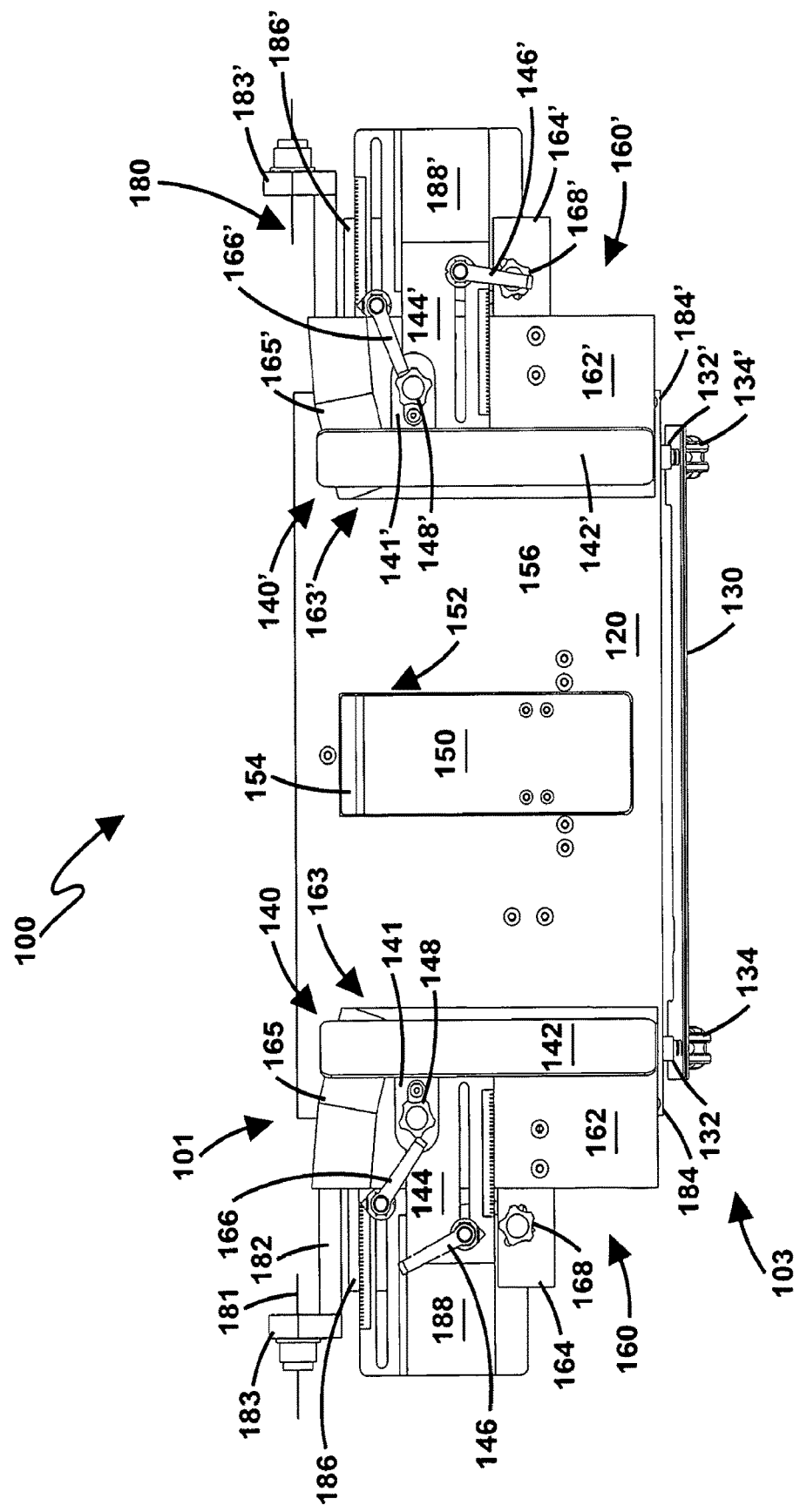

Deck 120 is advantageously, but not necessarily adapted to include a centrally positioned actuatable lift 150 (FIGS. 15, 17 & 18). The lift, generally provided in the form of a plate, is elongated in the article ingress direction to substantially span the length of the deck. An upstream end portion 152 includes a contoured free end 154 for unencumbered receipt of an inbound article. Again, and notionally, via such functionality, patterning is enhanced in that elevation packing is enabled (i.e., x-y-z (overlapping) arrayed patterning—height varied or variable columnation).

Stop 130, in the form of an end wall forming plate, is supported by deck 120 via spaced apart brackets 132, 132' carried on its underside, the brackets united via a brace 133 or the like (FIG. 18). The stop is advantageously but not necessarily adapted for operator translation relative to its support brackets. Notionally, the stop may be translated (e.g., slide) from a retracted, stowed position, corresponding to a stowed position or posture for the assembly itself, to an extended end wall forming operative position via operator actuation of a mechanical device such as cam handle 134 as shown. Moreover, stop 130 is advantageously, but not necessarily carried or supported in relation to deck 120 for actuation, for instance a pivoted retraction in furtherance of facilitating swift egress of a patterned article group (i.e., the stop may be actuated such that its upper edge retracts to a position below the surface of the deck, thus permitting a sliding egress of the patterned article group from the article accumulation pattern building load plate).

In furtherance of what is essential a fast acting gate functionality for the stop, pivot linkages unite frame 180 to stop 130 via stop support brackets 132, 1332' (FIG. 18). Lateral frame members 184, 184' are united to brackets 132, 132' via first linkages 136, 136', and longitudinal frame member 182 is united to each of support brackets 132, 132' via second linkages 137, 137', more particularly, linkages characterized by an actuator, for example a pneumatic actuator 138, 138' in the form of a rod/cylinder combination.

As should be readily appreciated, extension of the rod from the cylinder results in rotation of the stop support bracket down and away from the underside of the deck, thereby resulting in stop retraction.

Turning now to guides 142, 142' and blocks 162, 162', each structure is provided in the load plate assembly in the form of a subassembly. Advantageously, but not necessarily, each structure is translatably and rotationally supported relative to the deck, more particularly, the surface of the deck, via a track/track carriage interface as will be subsequently described.

As best viewed with reference FIG. 17, each guide subassembly 140, 140'(right/left) and each block subassembly 160, 160'(right/left) are commonly supported, indirectly, via opposing subassembly supports 186, 186'(right/left) extending from the frame members. Interposed between the guide/block subassemblies and the subassembly supports are track plates 188, 188' (FIGS. 15-18), the plates laterally extending from supports 186, 186', track carriages of each of the guide/block subassemblies carried thereon.

Block subassemblies 160, 160' are generally characterized by blocks 160, 160', track carriages 164, 164' operatively united to/with the blocks, and affixation mechanisms. Each block 160, 160' includes an upstream end portion 163, 163' having a contoured free end 165, 165' for unencumbered receipt of an inbound article. The blocks of the block subassemblies generally overlie the deck for translation thereover.

A first affixation mechanism 166, 166' of or related to block subassemblies 160, 160' permits select fixed/fixable transverse positioning of the block/block track carriage relative to the track, and thus relative to the deck (i.e., the block is operably positionable over a select portion of the deck across the width thereof), articles receivable upon such operably positioned block so as to be in an elevated condition relative to a surface of the deck. A second affixation mechanism 168, 168' of or related to block assemblies 160, 160' permits select fixed/fixable angular positioning of the block/block track carriage with regard to the track, and thus relative to the article ingress direction, as circumstances may warrant.

Guide subassemblies 140, 140' are generally characterized by guides 142, 142', track carriages 144, 144' operatively united to/with the guide, and affixation mechanisms. Guides 142, 142', as shown (FIGS. 15 & 17), are angularly oriented, generally extending upward from the deck surface and outward from a deck centerline extending in an article ingress direction. Moreover, the guides are generally in an elevated condition with reference to the deck surface, and are likewise in an elevated condition with reference to an article receiving surface of the blocks.

A first affixation mechanism 146, 146' of or related to guide subassemblies 140, 140' permits select fixed/fixable transverse positioning of the guide/guide track carriage relative to the track, and thus relative to the deck (i.e., the guide is adjustably positionable in relation to the deck, more particularly, the width thereof) so as to transversely guide articles traveling from the ingress portion of the article accumulation pattern building load plate towards the stop. A second affixation mechanism 148, 148' of or related to guide assemblies 140, 140' permits select fixed/fixable angular positioning of the guide with regard to the guide track carriage, and thus relative to the article ingress direction, as circumstances may warrant, in furtherance of forming a tapering channel towards the stop. More particularly, a tab or stem 141, 141' extending from guide, is angularly anchorable atop guide carriage 144, 144', the guide carriage adapted to permit receipt of a portion of the block of the block assembly (note especially FIGS. 15 & 17).

What has been described and depicted herein are preferred, non-limiting embodiments of Applicant's subject matter, along with some application contexts. Since the structures of the assemblies, subassemblies, and/or mechanisms disclosed herein may be embodied in other specific forms without departing from the spirit or general characteristics thereof, some of which forms have been indicated, the embodiments described and depicted herein/with are to be considered in all respects illustrative and not restrictive. Moreover, while nominal processing has be described and detailed, and to some degree alternate work pieces and systems, assemblies, etc. with regard thereto referenced, contemplated processes are not so limited. Accordingly, the scope of the subject invention is as defined in the language of the appended claims, and includes not insubstantial equivalents thereto.

That which is claimed:

1. An article accumulation pattern building load plate assembly comprising:
   a. a deck for support of patterned articles, articles of the patterned articles received at an ingress portion of the article accumulation pattern building load plate assembly from a metered article source, articles of the patterned articles extendable across a width of said deck in a direction transverse to an article ingress direction; and,
   b. a stop for retaining deck supported articles, said stop adjacent said deck and extending in a direction transverse to the article ingress direction, said stop delimiting an egress portion of the article accumulation pattern building load plate assembly, said deck adapted to include an actuatable lifter operably extendable relative to a surface of said deck, an article receivable upon an operably extended actuatable lifter so as to be in an elevated condition relative to said surface of said deck.

2. The assembly of claim 1 wherein an operative configuration for said deck is characterized by said ingress portion the article accumulation pattern building load plate assembly being at a greater elevation than said egress portion of the article accumulation pattern building load plate assembly.

3. The assembly of claim 1 further comprising a pivotably adjustable frame, said pivotably adjustable frame supporting said deck.

4. The assembly of claim 1 further comprising a pivotably adjustable frame, said pivotably adjustable frame supporting said deck, said deck being thereby angularly adjustable to a horizontal offset angle with a range of about 20-65 degrees.

5. The assembly of claim 1 wherein said stop comprises a retractable end wall forming plate.

6. The assembly of claim 1 wherein said stop comprises an actuatable panel.

7. The assembly of claim 1 wherein said stop is actuatable between first and second operative positions, said first operative position for patterned article retention, said second operative position for patterned article release.

8. The assembly of claim 1 further comprising a frame, said deck supported by said frame, said frame adapted for pivoting so as to angularly position said deck relative to a conveyor of an article infeed system.

9. The assembly of claim 1 further comprising a frame, said deck supported by said frame, said frame adapted for pivoting so as to angularly position said deck relative to a divider conveyor of an article infeed system.

10. The assembly of claim 1 further comprising a frame, said deck supported by said frame, said frame adapted for indexed pivoting so as to angularly position said deck relative to a divider conveyor of an article infeed system.

11. The assembly of claim 1 further comprising a frame, said deck supported by said frame, said frame characterized by a positioner adapted for cooperative receipt and select engagement with a positioner guide extending from an article infeed system, said frame thereby indexingly pivotable in relation to a conveyor of the article infeed system.

12. An article accumulation pattern building load plate assembly comprising:
    a. a deck for support of patterned articles, articles of the patterned articles received at an ingress portion of the article accumulation pattern building load plate assembly from a metered article source, articles of the patterned articles extendable across a width of said deck in a direction transverse to an article ingress direction; and,
    b. a stop for retaining deck supported articles, said stop adjacent said deck and extending in a direction transverse to the article ingress direction, said stop delimiting an egress portion of the article accumulation pattern building load plate assembly, said deck adapted to include an actuatable lifter operably extendable relative to a surface of said deck and intermediate a width of said deck, an article receivable upon an operably extended actuatable lifter so as to be in an elevated condition relative to said surface of said deck.

13. An article accumulation pattern building load plate assembly comprising:
    a. a deck for support of patterned articles, articles of the patterned articles received at an ingress portion of the article accumulation pattern building load plate assembly from a metered article source, articles of the patterned articles extendable across a width of said deck in a direction transverse to an article ingress direction;
    b. a stop for retaining deck supported articles, said stop adjacent said deck and extending in a direction transverse to the article ingress direction, said stop delimiting an egress portion of the article accumulation pattern building load plate assembly; and,
    c. spaced apart guides adjustably positionable in relation to said deck so as to transversely guide articles traveling from said ingress portion of the article accumulation pattern building load plate towards said stop.

14. The assembly of claim 13 wherein said spaced apart guides slopingly extend upward of said deck and away from a deck centerline extending in the article ingress direction.

15. The assembly of claim 13 wherein said spaced apart guides are width adjustable.

16. The assembly of claim 13 wherein said spaced apart guides are angularly adjustable in relation to the article ingress direction.

17. The assembly of claim 13 wherein said spaced apart guides are both width adjustable and angularly adjustable in relation to the article ingress direction.

18. The assembly of claim 1 wherein patterned articles of deck supported patterned article are characterized by article columns.

19. The assembly of claim 1 wherein patterned articles of deck supported patterned article are characterized by article columns and article rows.

20. The assembly of claim 1 wherein patterned articles of deck supported patterned article are characterized by arrays.

21. The assembly of claim 1 wherein patterned articles of deck supported patterned article are characterized by arrays, said arrays selected from the group consisting of 2×1, 3×1, 4×1, 2×2 and 3×3.

22. The assembly of claim 13 wherein an operative configuration for said deck is characterized by said ingress portion the article accumulation pattern building load plate assembly being at a greater elevation than said egress portion of the article accumulation pattern building load plate assembly.

23. The assembly of claim 13 further comprising a pivotably adjustable frame, said pivotably adjustable frame supporting said deck.

24. The assembly of claim 13 further comprising a pivotably adjustable frame, said pivotably adjustable frame supporting said deck, said deck being thereby angularly adjustable to a horizontal offset angle with a range of about 20-65 degrees.

25. The assembly of claim 13 wherein said stop comprises a retractable end wall forming plate.

26. The assembly of claim 13 wherein said stop comprises an actuatable panel.

27. The assembly of claim 13 wherein said stop is actuatable between first and second operative positions, said first operative position for patterned article retention, said second operative position for patterned article release.

28. The assembly of claim 13 wherein patterned articles of deck supported patterned article are characterized by article columns.

29. The assembly of claim 13 wherein patterned articles of deck supported patterned article are characterized by article columns and article rows.

30. The assembly of claim 13 wherein patterned articles of deck supported patterned article are characterized by arrays.

31. The assembly of claim 13 wherein patterned articles of deck supported patterned article are characterized by arrays, said arrays selected from the group consisting of 2×1, 3×1, 4×1, 2×2 and 3×3.

32. The assembly of claim 13 further comprising a frame, said deck supported by said frame, said frame adapted for pivoting so as to angularly position said deck relative to a conveyor of an article infeed system.

33. The assembly of claim 13 further comprising a frame, said deck supported by said frame, said frame adapted for pivoting so as to angularly position said deck relative to a divider conveyor of an article infeed system.

34. The assembly of claim 13 further comprising a frame, said deck supported by said frame, said frame adapted for indexed pivoting so as to angularly position said deck relative to a divider conveyor of an article infeed system.

35. The assembly of claim 13 further comprising a frame, said deck supported by said frame, said frame characterized by a positioner adapted for cooperative receipt and select engagement with a positioner guide extending from an article infeed system, said frame thereby indexingly pivotable in relation to a conveyor of the article infeed system.

36. Apparatus for sequential receipt of articles in furtherance of forming a selectively patterned article group characterized by at least a single row and multiple columns in advance of subsequent transfer of the selectively patterned article group from the apparatus, the apparatus comprising:
   a. a frame;
   b. a deck upon which accumulating articles are supportable, said deck supported by said frame and having a length corresponding to a direction of article flow, and a width corresponding to a transverse direction to article flow;
   c. an actuatable stop supported by said frame adjacent said deck, said stop extending in the transverse direction of article flow for retention of accumulating articles supported upon said deck, actuation of said actuatable stop permitting a translated egress of the selectively patterned article group from said deck;
   d. spaced apart blocks operably positionable over select portions of said deck, articles receivable upon operably positioned spaced apart blocks so as to be in an elevated condition relative to a surface of said deck; and,
   e. spaced apart guides adjustably positionable so as to direct articles towards said stop.

37. An article accumulation pattern building load plate assembly comprising:
   a. a deck for support of patterned articles, articles of the patterned articles received at an ingress portion of the article accumulation pattern building load plate assembly from a metered article source, articles of the patterned articles extendable across a width of said deck in a direction transverse to an article ingress direction;
   b. a stop for retaining deck supported articles, said stop adjacent said deck and extending in a direction transverse to the article ingress direction, said stop delimiting an egress portion of the article accumulation pattern building load plate assembly; and
   c. spaced apart blocks operably positionable over select portions of said deck, articles receivable upon operably positioned spaced apart blocks so as to be in an elevated condition relative to a surface of said deck.

38. The assembly of claim 37 wherein an operative configuration for said deck is characterized by said ingress portion the article accumulation pattern building load plate assembly being at a greater elevation than said egress portion of the article accumulation pattern building load plate assembly.

39. The assembly of claim 37 further comprising a pivotably adjustable frame, said pivotably adjustable frame supporting said deck.

40. The assembly of claim 37 further comprising a pivotably adjustable frame, said pivotably adjustable frame supporting said deck, said deck being thereby angularly adjustable to a horizontal offset angle with a range of about 20-65 degrees.

41. The assembly of claim 37 wherein said stop comprises a retractable end wall forming plate.

42. The assembly of claim 37 wherein said stop comprises an actuatable panel.

43. The assembly of claim 37 wherein said stop is actuatable between first and second operative positions, said first operative position for patterned article retention, said second operative position for patterned article release.

44. The assembly of claim 37 wherein patterned articles of deck supported patterned article are characterized by article columns.

45. The assembly of claim 37 wherein patterned articles of deck supported patterned article are characterized by article columns and article rows.

46. The assembly of claim 37 wherein patterned articles of deck supported patterned article are characterized by arrays.

47. The assembly of claim 37 wherein patterned articles of deck supported patterned article are characterized by arrays, said arrays selected from the group consisting of 2×1, 3×1, 4×1, 2×2 and 3×3.

48. The assembly of claim 37 further comprising a frame, said deck supported by said frame, said frame adapted for pivoting so as to angularly position said deck relative to a conveyor of an article infeed system.

49. The assembly of claim 37 further comprising a frame, said deck supported by said frame, said frame adapted for pivoting so as to angularly position said deck relative to a divider conveyor of an article infeed system.

50. The assembly of claim 37 further comprising a frame, said deck supported by said frame, said frame adapted for indexed pivoting so as to angularly position said deck relative to a divider conveyor of an article infeed system.

51. The assembly of claim 37 further comprising a frame, said deck supported by said frame, said frame characterized by a positioner adapted for cooperative receipt and select engagement with a positioner guide extending from an article infeed system, said frame thereby indexingly pivotable in relation to a conveyor of the article infeed system.

* * * * *